June 6, 1967   F. S. RADER   3,323,442
ALUMINUM FOIL ROASTING BAG
Filed Sept. 14, 1965
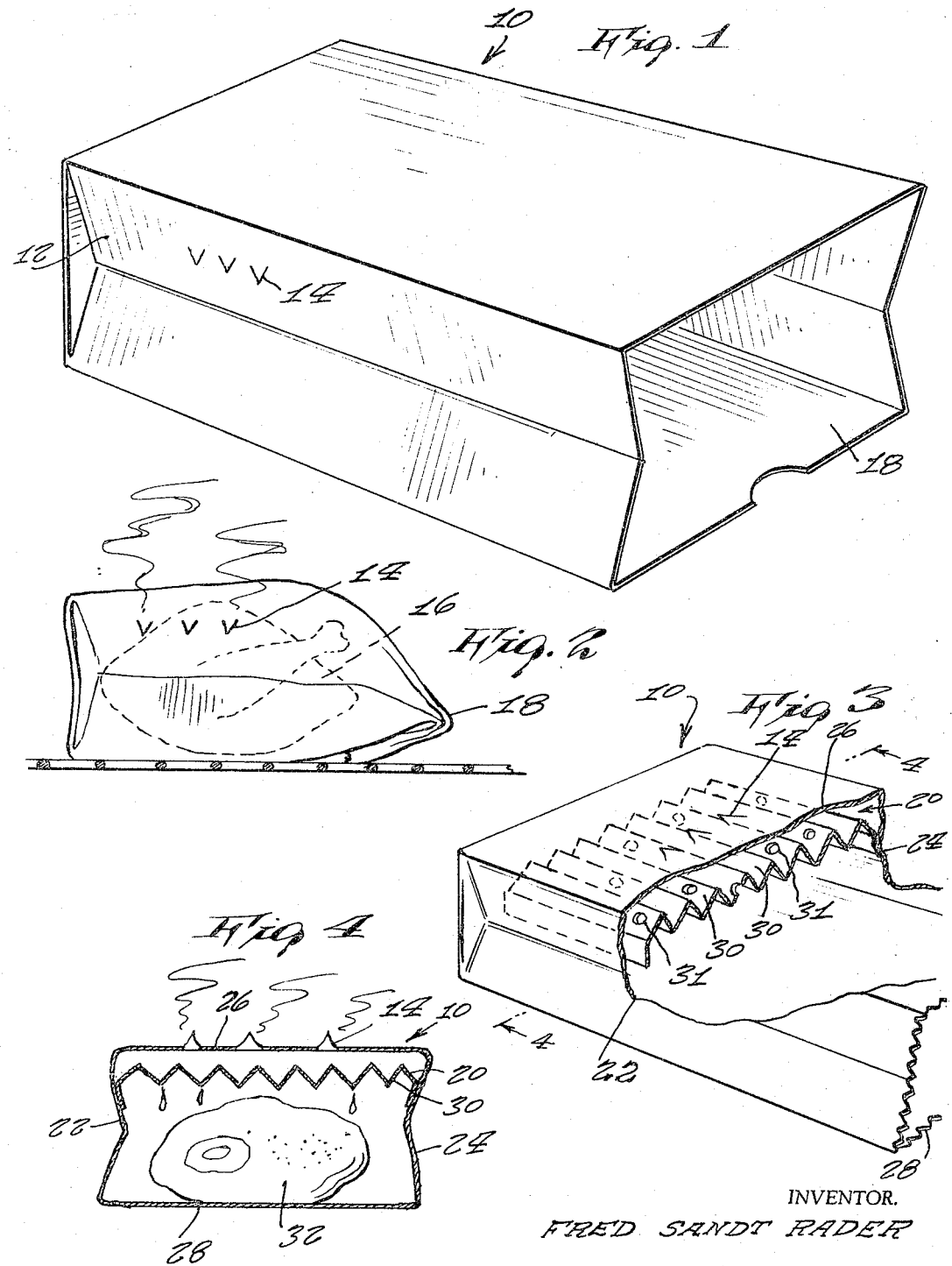
INVENTOR.
FRED SANDT RADER 3,323,442
ALUMINUM FOIL ROASTING BAG
Fred Sandt Rader, Box 46, Springfield, Oreg. 97477
Filed Sept. 14, 1965, Ser. No. 487,153
3 Claims. (Cl. 99—347)

My invention is directed toward foil roasting bags arranged to accommodate food to be roasted and insertable into an oven for cooking, whereby the food is kept moist and is self-basting.

It is an object of my invention to provide a new and improved disposable roasting bag made of aluminum, having opposite sides, scored but not pierced, whereby if excess pressure builds up in the bag during cooking, the scored regions will give way before the main bag areas rupture to release the excess pressure and permit the cooking operation to continue.

Another object is to provide a new and improved roasting bag of the character indicated, having a special insert which promots self basting action.

All of the foregoing and still further objects and advantages of my invention will now be explained with reference both to this specification and to the accompanying drawings wherein:

FIGURE 1 is a perspective view of one form of my bag;

FIGURE 2 shows the bag in FIGURE 1 in use;

FIGURE 3 is a fragmentary view of a modification of my bag; and

FIGURE 4 is a view through 4—4 showing the modification of FIGURE 3, in use.

Referring now to FIGURES 1-2, there is shown an aluminum foil bag identified generally at 10 and having opposite sides 12 thereof having V-shaped scoring marks 14. When food such as a turkey 16, is inserted into the bag, and the open end 18 thereof is folded upon itself to seal the turkey in the bag, the loaded bag can be inserted into an oven and heated. The marks 14 then serve to release excess pressure as previously discussed.

As shown in FIGURES 3-4, the bag 10 can have an aluminum foil strip 20 mounted therein and extending transversely between opposite vertical side walls 22 and 24 and spaced apart from upper and lower side walls 26 and 28. Strip 20 can have longitudinally extended corrugations 30 having perforations 31 therein. A roastable meat 32 can be inserted into the bag between strip 20 and lower side wall 28. Then when the bag is sealed with the meat therein and is heated in an oven, the steam generated internally will condense on the bottom of the corrugations and drip down onto the meat. Some steam will pass through perforations and condense either on the top surface of the corrugations or on the bottom surface of the upper side wall. In either case, the steam will condense, and the condensate will drip downward through the holes and back onto the meat. This dripping of condensate provides a self-basting action which enhances the cooking and flavor of the roasted meat.

While I have described my invention with particular reference to the drawings, my protection is to be limited only by the terms of the claims which follow.

I claim:

1. A disposable aluminum foil bag having one open end adapted to receive food for roasting, said bag having upper and lower horizontal walls and oppositely disposed vertical walls, said bag also having a corrugated strip of aluminum foil extending transversely in a portion of the bag between the two vertical walls and spaced apart from the upper and lower walls whereby when said food is inserted in said bag and said open end is folded upon itself, said bag can be heated inside an oven for cooking and pressure builds up within the bag, external surfaces of said bag being provided with V-shaped scoring marks which will be vented under pressure before said pressure attains a value which will cause the bag itself to rupture in the oven.

2. A bag as set forth in claim 1, wherein said corrugations extend longitudinally within said bag.

3. A bag as set forth in claim 2, wherein said strip is provided with a plurality of spaced apart perforations.

References Cited

UNITED STATES PATENTS

| 2,225,389 | 12/1940 | Osterdahl | 55—376 |
| 2,361,344 | 10/1944 | Yates. | |
| 2,844,475 | 7/1958 | Barnes et al. | 99—171 X |
| 2,850,392 | 9/1958 | Gunsberg | 99—171 |
| 2,881,078 | 4/1959 | Oritt | 99—171 |
| 3,052,554 | 9/1962 | Colman | 99—171 |

FOREIGN PATENTS 252,667  2/1963  Australia.

BILLY J. WILHITE, *Primary Examiner.*